(12) United States Patent
Proft et al.

(10) Patent No.: US 8,062,988 B2
(45) Date of Patent: Nov. 22, 2011

(54) PROCESS FOR THE PRODUCTION OF A CATALYST PREPARATION AND USE OF THE CATALYST PREPARATION

(75) Inventors: Bernd Proft, Neukirchen-Vluyn (DE); Elke Hirschberg, Moers (DE); Regina Optehostert, Moers (DE); Jochen Winkler, Rheurdt (DE); Klaus Pipplies, Neukirschen-Vinyn (DE); Michael Wedler, Duisburg (DE)

(73) Assignee: Sachtleben Chemie GmbH, Duisburg (DE)

( * ) Notice: Subject to any disclaimer, the term of this patent is extended or adjusted under 35 U.S.C. 154(b) by 0 days.

(21) Appl. No.: 12/772,761

(22) Filed: May 3, 2010

(65) Prior Publication Data

US 2010/0209992 A1    Aug. 19, 2010

Related U.S. Application Data

(63) Continuation of application No. 10/582,827, filed as application No. PCT/EP2004/014026 on Dec. 9, 2004, now abandoned.

(30) Foreign Application Priority Data

Dec. 19, 2003 (DE) .................................. 103 59 839

(51) Int. Cl.
*B01J 29/04* (2006.01)
*B01J 27/02* (2006.01)
*B01J 27/053* (2006.01)
*B01J 23/00* (2006.01)

(52) U.S. Cl. ........... 502/60; 502/216; 502/217; 502/300

(58) Field of Classification Search .................. 502/60, 502/216, 217, 300
See application file for complete search history.

(56) References Cited

U.S. PATENT DOCUMENTS

| 5,068,056 A | 11/1991 | Robb |
| 5,656,716 A | 8/1997 | Schmidt et al. |
| 5,808,143 A | 9/1998 | Karrer et al. |

FOREIGN PATENT DOCUMENTS

| DE | 4308114 | 11/1993 |
| DE | 4417185 | 11/1995 |
| EP | 0 736 560 | 10/1996 |
| WO | WO 98/05421 | * 2/1998 |

* cited by examiner

*Primary Examiner* — William Cheung
(74) *Attorney, Agent, or Firm* — Fulbright & Jaworski L.L.P.

(57) ABSTRACT

A process is described for the production of a catalyst preparation, in which the catalyst containing at least one inorganic compound which is solid under standard conditions is comminuted by means of a dispersion unit into particles having a maximum average particle size $d_{50.3}$ of 2 μm, preferably a maximum of 1 μm, implemented in accordance with DIN 66141 and DIN 66144, and is distributed at a concentration of from 1 to 50 wt. % (relative to the finished catalyst preparation) in a liquid.

12 Claims, No Drawings

PROCESS FOR THE PRODUCTION OF A CATALYST PREPARATION AND USE OF THE CATALYST PREPARATION

This application is a continuation of Ser. No. 10/582,827 filed Aug. 2, 2006, abandoned, hereby incorporated by reference in its entirety, which is a which is a §371 of PCT/EP2004/014026, filed Dec. 9, 2004. This application also claims priority from DE 10359839.1 filed Dec. 19, 2003.

The invention relates to a process for the production of a catalyst preparation and the use thereof.

Solid catalysts are frequently utilised in the production of polyesters. Such catalysts may, for example, be $TiO_2$ or compounds derived from $TiO_2$. For example, EP 0736560 describes catalysts comprising alkali metal titanate or alkaline earth metal titanate.

In heterogeneous catalysis the catalyst is not dissolved in the reaction medium but is present as a separate solid phase. In one variant on this catalysis, the catalyst remains as a separate solid phase within the system. In some cases, such as, for example, in catalysis of esterification processes, the catalyst is added as a powder which, however, dissolves in the course of the reaction. Here, a continuous transition from heterogeneous to homogeneous catalysis takes place.

The distribution of the catalyst in the reaction medium greatly influences the course of the reaction.

It is in principle possible to supply a heterogeneous catalyst in powder form to the reaction medium. However, in continuous processes specifically, in addition to the disadvantage of poor meterability of the powders, this method has deficiencies in terms of distributing the catalyst rapidly in the reaction medium. It is therefore prior art practice to utilise slurries of the catalyst in liquids.

Since the catalyst particles settle readily when the catalyst slurries are stored, such slurries must be agitated before use, because otherwise the metering of the catalyst would in turn not be sufficiently precise. Stokes' law states that the rate of sedimentation v is proportional to the square of the diameters d of the catalyst spherules and to the density difference $\Delta\rho$ between solid and liquid, and inversely proportional to the viscosity $\eta$ of the suspending liquid:

$$v = \frac{d^2 \cdot \Delta\rho \cdot g}{18\eta}$$

(Stokes' law)

It is apparent from the equation that over time all the catalyst particles must settle, provided that their rate of sedimentation is greater than their thermal (Brownian) motion.

In addition to gravity, the van der Waals force of attraction, also known as the "dispersion force", also acts on the particles. If not opposed by stabilising forces, for example a like electrostatic charge, or adsorbed polymers, the dispersion force causes flocculation to take place among the particles. If the particles flocculate, then larger agglomerates arise which settle all the more rapidly in accordance with Stokes' equation. Flocculated, settled systems, on the other hand, have the advantage that they can be agitated readily.

The opposite is the case with slurries, in which sedimentation out of a flocculation-resistant distribution takes place because of the size of the catalyst particles. Apart from the disadvantage of settling to a very densely packed sediment now barely able to be agitated, a further disadvantage of such systems is that they generally contain undesirable auxiliary substances (polymeric wetting and dispersing agents).

The object of the invention is to provide a process for the production of a catalyst preparation, in which the disadvantages of the prior art, namely in particular
- excessively coarse distribution of the catalyst
- poor meterability of the catalyst powder
- poor meterability of the catalyst when settled slurries are used
- sedimentation of the catalyst to a solid bottom sediment which cannot be agitated are avoided, and in which the catalyst obtained is, on the one hand, sufficiently stable in storage and, on the other, can deploy the maximum catalytic activity.

The object is achieved by a process for the production of a catalyst preparation, in which the catalyst, containing at least one inorganic compound which is solid under standard conditions, is comminuted by means of a dispersion unit into particles having a maximum average particle size $d_{50.3}$ of 2 µm, preferably a maximum of 1 µm, implemented in accordance with DIN 66141 and DIN 66144, and is distributed at a concentration of from 1 to 50 wt. %, preferably 20 to 40 wt. % (relative to the finished catalyst preparation) in a liquid. The particle size is preferably measured by laser diffraction.

Surprisingly, without the aid of wetting or dispersing agents or otherwise any auxiliary substance which stabilises the suspension, the catalyst can in this way be produced as a paste which is solidified in the resting state. The paste does not begin to flow until a minimum shear stress, the yield point $\tau_0$, is reached.

The yield point of the catalyst paste rises as the catalyst concentration increases and the particle size decreases, respectively. The yield point of the catalyst paste can be adjusted by varying the catalyst concentration and the particle size. The catalyst paste preferably has a yield point $\tau_0$ of at least 0.1 Pa at 23° C. (room temperature), particularly preferably 1 to 30 Pa and most particularly preferably 5 to 30 Pa, at 23° C. The yield point is determined in accordance with DIN 53019 in the Z2 DIN cylinder measuring system (described in the data sheet "Data for the standard measuring system in accordance with DIN 53019" for Viscolab/Rheolab MC 10 from Physika Meβtechnik GmbH, Stuttgart) and evaluation in accordance with Bingham. For this purpose, the sample (catalyst paste) is charged into the Z2 standard measuring system where it is first left to rest at room temperature for a period of 24 hours. Measuring takes place with 100 measuring points with a measuring time of 5 sec per measuring point within the shear rate range 0 to 100 l/s (linear ramp).

The process described guarantees that the stable catalyst paste can be brought by agitation to a form in which it is readily meterable and can be mixed effectively into the reaction mixture, with the catalyst activity being put to optimal use. Here, the catalyst is present in colloidal form and is unusually stable in storage. Even when the suspension is stored for a year, the catalyst does not settle and retains its full activity. It is furthermore advantageous that the utilisation of auxiliary substances for creating a yield point (for example polyurethane thickeners, polyacrylate thickeners, cellulose ether, highly disperse silica) is superfluous.

The inorganic compound which is solid under standard conditions (catalyst or catalyst constituent) can, for example, be selected from the following substances: titanium dioxide, titanium-dioxide-containing substances, titanates, zeolites, aluminium oxide, boron oxides, germanium dioxide, antimony(III) oxide, cerium oxides, barium sulfate, zinc sulfide, silicon dioxide or mixtures of these substances.

Titanium dioxide and the titanium-containing catalysts described in EP 0736560: hydrated titanium dioxide corresponding to the composition
$yTiO_2 \cdot zH_2O$ (where $y=1$, $z=0.01$ to 2), or a titanate corresponding to the composition
$(Me_nO)_x \cdot (TiO_2)_y \cdot (H_2O)_z$ (where Me=Li, Na, K, Rb, Cs, Mg, Ca, Sr, Ba; $n=1$ for Me=alkaline earth metal and $n=2$ for Me=alkali metal; $x=0.0001$ to 6; $y=1$; $z=0.01$ to 2).
are particularly preferred here.

Stirred ball mills, ultrasonic homogenisers, or ultrasonic disintegrators, high-pressure homogenisers, dispersing equipment based on the high-power pulse-type technique, dispersing equipment based on the impact jet process (for example counter-jet-type mills) or impact stream-type mills (for example microjet dispersers) can, for example, be utilised as the dispersion unit. Stirred ball mills are particularly preferred.

The catalyst can be pre-dispersed or formed into a slurry in the liquid before the comminution. For this, dissolvers, stirrers (for example straight-arm paddle agitators, cage-type agitators or toothed-disk stirrers), Hoesch turbines or Ystral mills can be used. The catalyst is then brought to the desired particle size in the liquid by means of one of the dispersion units described above.

The catalyst can also be dry-comminuted and then formed into a slurry in the liquid in a dissolver, stirrer (for example straight-arm paddle agitator, cage-type agitator or toothed-disk stirrer), a turbine or an Ystral mill.

The following relationship generally applies to the choice of particle size and catalyst concentration: The smaller the particle size, the lower the selected catalyst concentration should be within the limits indicated, and vice versa.

The following substances are preferably utilised individually or in mixture as the liquid: water, alcohols having 1 to 20 C atoms (for example methanol, ethanol, propanol (all isomers), butanol (all isomers), diols such as alkane diols or cycloalkane diols having 2 to 12 C atoms (for example ethylene glycol, 1,3-propanediol, 1,4-butanediol, 1,4-cyclohexane dimethanol), carboxylic acids (for example formic acid, ethanoic acid, propanoic acid, butanoic acid, pentanoic acid) or fatty acids.

The process according to the invention can, for example, be carried out as follows (with no limitations being, however, associated therewith):

Where it is not already present in powder form, the catalyst material is powdered in known manner, stirred into the liquid and pre-dispersed (for example using a toothed-disk dissolver). The suspension obtained then treated by means of a dispersion unit (for example a bead mill) until the average particle size $d_{50.3}$ reaches a maximum value of 2 μm, preferably a maximum of 1 μm. The catalyst preparations produced according to the invention are used, inter alia, in condensation and polycondensation reactions (for example the amidation of carboxylic acids, esterifications of carboxylic acids and their hydrolysis), in transesterifications of esters, in transamidations of amides, in rearrangements (for example alpha-pinene into camphene, aldol reaction) and in olefin polymerisation.

The catalyst preparation produced according to the invention can furthermore be used in photocatalysis. Thus, for example a $TiO_2$-containing catalyst preparation can be introduced into a medium which is polluted with noxious bacterial or chemical substances, with the noxious substances being oxidised in the presence of light. Areas for utilising such photocatalysts are paints, lacquers, finishes, paper, wallcoverings, self-cleaning surfaces or antibacterial surfaces.

A further possible use for the catalyst preparation is to boost the effect of catalyst enzyme systems. For this, for example, enzymes can be added during the production of the catalyst preparation to the inorganic compound distributed in the liquid. The enzymes settle out on the surface of the solid. The enzymes are advantageously present there in distributed form and are at the same time immobile.

The invention is explained in greater detail with reference to the Embodiment Example which follows:

EXAMPLE 1

Production of a Stable Titanium-Containing Catalyst Preparation 280 g of a pulverulent Ti-containing catalyst having a Ti content of 48.1 wt. %, a specific BET surface of 71.5 $m^2/g$ and an average particle size $d_{50.3}$ of 2.7 μm, which has been produced in accordance with the method described in EP 0736560, were stirred into 520 g monoethylene glycol by means of a toothed-disk dissolver (diameter 4 cm, speed 1300 r.p.m.) and dispersed for 45 minutes. The suspension thus formed was ground in a stirred ball mill (Dispermat SL, 125 ml grinding compartment, 100 ml glass beads, diameter 1 mm) for 20 minutes at 3000 r.p.m. and 50 minutes at 4000 r.p.m. in a circulating process. The suspension was separated from the beads and the coarse fraction by way of a sieve (56 μm mesh). The particle size determination (laser diffraction, Helos) showed an average particle diameter $d_{50.3}$ of 0.92 μm with a breadth of distribution of $B_{90/10}=1.5$ μm. The solids content was around 35 wt. %. After three days' storage at 80° C. the suspension also showed no bottom sediment formation. The dispersed suspension was charged into a Z2 DIN measuring system and left to stand at room temperature for 48 hours. Measurement took place with 100 measuring points with a measuring time of 5 sec per measuring point within the shear rate range of 0 to 100 l/s (linear ramp). The shear stress (on commencing shear stressing) of the suspension was determined at $\tau_0=22.6$ Pa (measurement in accordance with DIN 53019, Z2 DIN, evaluation in accordance with Bingham).

The invention claimed is:

1. A process comprising producing a catalyst without the aid of a wetting or dispersing agent for preparing a stable dispersion preparation by comminuting a catalyst containing at least one inorganic compound which is solid under standard conditions with a dispersion unit into particles having a maximum average particle size $d_{50.3}$ of 2 μm, implemented in accordance with DIN 66141 and DIN 66144, and is distributed at a concentration of from 1 to 50 wt. %, relative to the finished catalyst preparation, in a liquid; and performing a condensation reaction, a polycondensation reaction, a transesterification of an ester, a transamidation of an amide, a rearrangement or an olefin polymerization with said catalyst preparation.

2. The process according to claim 1, wherein the catalyst is distributed in a liquid at a concentration of from 20 to 40 wt %, relative to the finished catalyst preparation.

3. The process according to claim 1, wherein the solid inorganic compound is at least one compound selected from the group consisting of titanium dioxide, titanium-dioxide-containing substances, titanates, zeolites, aluminum oxide, boron oxides, germanium dioxide, antimony(III) oxide, cerium oxides, barium sulfate, zinc sulfide, and silicon dioxide.

4. The process according to claim 3, wherein the solid inorganic compound is at least one compound selected from the group consisting of hydrated titanium dioxide corresponding to the composition $yTiO_2 \cdot zH_2O$, wherein y is 1, z is from 0.01 to 2, and a titanate of composition $(Me_nO)_{x'} \cdot (TiO_2)_{y'} \cdot (H_2O)_{z'}$, wherein Me is an alkaline earth metal or an alkaline metal selected from the group consisting of Li, Na, K, Rb, Cs, Mg, Ca, Sr and Ba; wherein n is 1 for Me is said alkaline earth metal and wherein n is 2 if Me is said alkali metal; x' is from 0.0001 to 6; y' is 1 and z' is from 0.01 to 2.

5. The process according to claim 1, wherein the particles have a maximum average particle size $d_{50.3}$ of 1 μm.

6. The process according to claim 1, wherein the following said unit selected from the group consisting of a stirred ball mill, an ultrasonic homogenizer, an ultrasonic disintegrator, a high-pressure homogenizer, dispersing equipment based on the high-power pulse-type technique, dispersing equipment based on the impact jet process and an impact stream-type mill.

7. A process according to claim 1, wherein the liquid is at least on liquid selected from the group consisting of water, a $C_1$-$C_{20}$ alcohol, a diol, a carboxylic acid and a fatty acid.

8. A method comprising performing a photocatalysis reaction with the catalyst preparation of claim 1, which is without a dispersing or a wetting agent prepared by a process comprising producing a catalyst preparation by comminuting a catalyst containing at least one inorganic compound which is solid under standard conditions with a dispersion unit into particles having a maximum average particle size $d_{50.3}$ of 2 μm, implemented in accordance with DIN 66141 and DIN 66144, and is distributed at a concentration of from 1 to 50 wt. %, relative to the finished catalyst preparation, in a liquid.

9. A method comprising boosting the effect of a catalyst enzyme system with the catalyst of claim 1, which is prepared by a process comprising producing a catalyst preparation without a dispersing or a wetting agent by comminuting a catalyst containing at least one inorganic compound which is solid under standard conditions with a dispersion unit into particles having a maximum average particle size $d_{50.3}$ of 2 μm, implemented in accordance with DIN 66141 and DIN 66144, and is distributed at a concentration of from 1 to 50 wt. %, relative to the finished catalyst preparation, in a liquid.

10. The process of claim 1, wherein the catalyst preparation is a paste.

11. The process of claim 8, wherein the catalyst preparation is a paste.

12. The process of claim 9, wherein the catalyst preparation is a paste.

* * * * *